United States Patent [19]

Adams

[11] Patent Number: 4,598,475
[45] Date of Patent: Jul. 8, 1986

[54] NUTCRACKER WITH AUTOMATIC ADJUSTMENT MEANS

[76] Inventor: Wesley T. Adams, 3609 Henderson Dr., Greensboro, N.C. 27410

[21] Appl. No.: 720,442

[22] Filed: Apr. 5, 1985

[51] Int. Cl.4 .............................................. A23N 5/00
[52] U.S. Cl. ..................................... 30/120.5; 99/573
[58] Field of Search ................. 30/120.2, 120.5, 120.3, 30/120.4; 99/573

[56] References Cited

U.S. PATENT DOCUMENTS

| | | | |
|---|---|---|---|
| 1,192,846 | 8/1916 | Boyer | 30/120.5 |
| 1,225,484 | 5/1917 | Payne | 30/120.5 |
| 1,367,384 | 2/1921 | Harrison | 30/120.4 |
| 1,791,992 | 2/1931 | Wiemers | 30/120.5 |
| 2,074,337 | 3/1937 | Krag | 99/573 |
| 2,178,375 | 10/1939 | Lennard | 30/120.5 |
| 2,200,515 | 5/1940 | Moeller | 99/573 |
| 2,385,556 | 9/1945 | Voigt | 99/573 |
| 2,543,886 | 3/1951 | Brookey | 30/120.5 |
| 2,731,994 | 1/1956 | Snell | 30/120.5 |

FOREIGN PATENT DOCUMENTS 508990 10/1930 Fed. Rep. of Germany ..... 30/120.3

Primary Examiner—Jimmy C. Peters
Attorney, Agent, or Firm—W. Thad Adams, III

[57] ABSTRACT

A nutcracker (10) is disclosed which is characterized by an automatic adjustment to differing-sized nuts during the cracking motion. Nutcracker (10) includes a base (11), an upright support (12) carried by base (11) and a slide bar (16) mounted for limited sliding movement on upright support (12). A nut-cracking head (40) is pivotally mounted for sliding movement on slide bar (16) and a handle (30) is carried by base (11) to move the slide bar (16) back and forth along its direction of travel. A rack (22) is mounted on the slide bar (16) and a tooth (46) is carried by head (40) and positioned to pivot towards and engage rack (22) at a point thereon dependent on the size of the nut as the handle moves head (40) into engagement with the nut to arrest the free movement of the head and cause the head (40) to move in unison with handle (30) as handle (30) continues to move into nut-cracking position. Accordingly, the nut itself provides the means for adjusting head (40) to the proper position to crack successive, differing-sized nuts.

6 Claims, 6 Drawing Figures

NUTCRACKER WITH AUTOMATIC ADJUSTMENT MEANS

TECHNICAL FIELD AND BACKGROUND OF THE INVENTION

This invention relates to a nutcracker having means for automatically adjusting the cracking mechanism to the size of the nut being cracked. The adjustment occurs as the nut is being cracked and eliminates the necessity of making an adjustment after each cracking operation and before the next. A considerable amount of time is saved, since on many prior art devices, one is not sure that adjustment is required for a particular nut until after the cracker has failed to crack it. Hence, in many prior art devices two cracking motions are required—one to check the adjustment of the cracker and one to actually crack the nut. In some prior art devices even three or more attempts may be necessary since the adjustment process is strictly by trial and error.

SUMMARY OF THE INVENTION

So far as is known, no prior art device automatically adjusts the cracking mechanism to compensate for different sized nuts. Likewise, no prior art device is known which permits adjustment to be made during the cracking motion so that a trial and error adjustment procedure is avoided.

Therefore, it is an object of the invention to provide a nutcracker which automatically adjusts the cracking mechanism to the size of the nut to be cracked.

It is another object of the invention to provide a nutcracker which will crack a wide variety of different-sized nuts without making manual adjustment to the mechanism.

It is yet another object of the present invention to provide a nutcracker which makes the size adjustment to each nut as the cracking motion is under way.

These and other objects and advantages of the present invention are achieved in the preferred embodiment disclosed below by providing a base having an upright support carried thereon. A slide bar is mounted for limited sliding movement on the upright support and a nut-cracking head is pivotally mounted for sliding movement on said slide bar independent of the sliding movement of the slide bar on the upright support.

The head is mounted on the slide bar to engage and bear against a nut positioned on the base beneath the head. A handle is carried by the base in operative relation to the slide bar to move the slide bar back and forth along its direction of travel in response to movement of the handle.

A rack is carried by the slide bar and a tooth is carried by the nut-cracking head on the opposite side of the head from the nut engaging portion thereof. The tooth is positioned to pivot towards and engage the rack at a point dependent on the size of the nut as the handle moves into engagement with the nut to arrest the free movement of the head and cause the head to move in unison with the handle as the handle continues to move into nut-cracking position. The head pivots out of rack-engaging position and permits independent movement of the head relative to the slide bar as the handle is moved out of nut-cracking position. In this way, the nut itself provides the means for adjusting the nut-cracking head to the proper position to crack successive, differing-sized nuts.

Preferably, the support and the slide bar are each vertically mounted in relation to the base. A spring is preferably provided for normally urging the handle out of nut-cracking position whereby the head is released from engagement with the slide bar after each nut-cracking operation.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
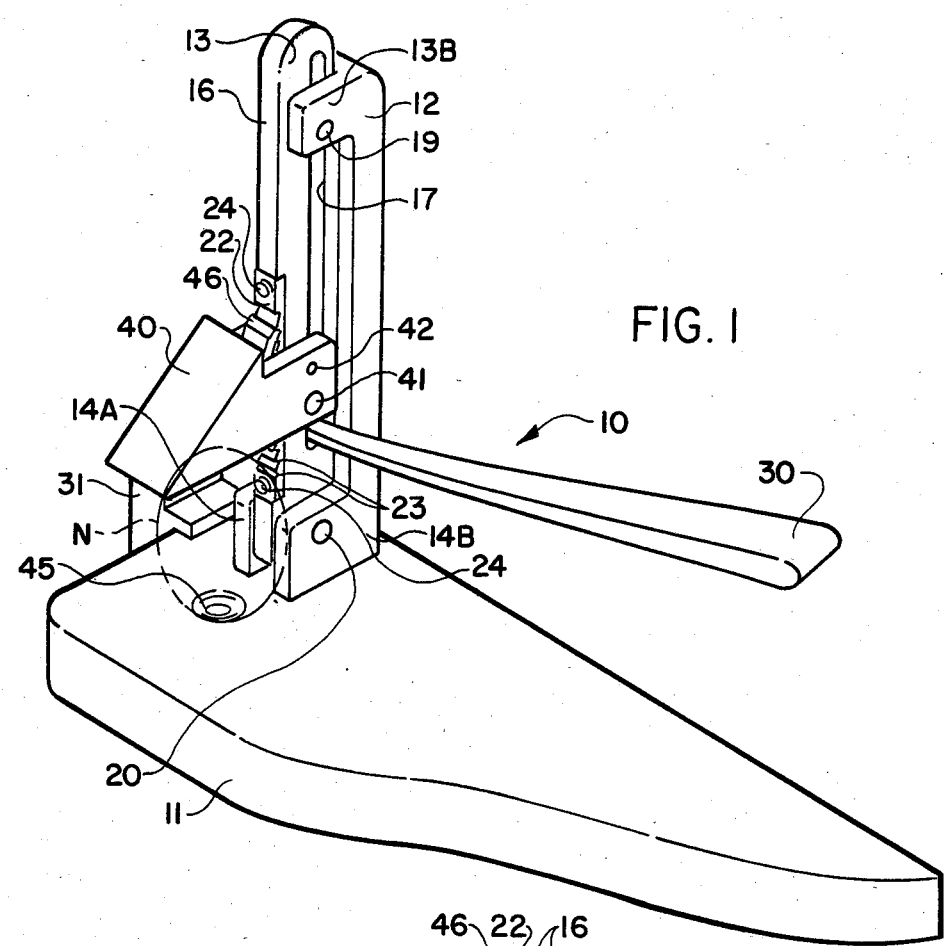
FIG. 1 is a perspective view of a preferred embodiment of the invention.

Referring now specifically to the drawings, a nut cracker according to the present invention is illustrated in FIG. 1 and generally designated by reference numeral 10. In the preferred embodiment disclosed in this application, the nut cracker includes a base 11. However, a clamp-type arrangement by which the nut cracker 10 is secured to a table-top or other support could also be used. An upright support 12 is fixedly secured to base 11 and extends vertically upright therefrom. Upright support 12 is generally in the shape of a shallow "U" and is provided with two pairs of spaced-apart arms 13A and 13B, and 14A and 14B, respectively. A slide bar 16 is mounted in the space defined between the respective pairs of arms 13A, 13B, and 14A, 14B. Slide bar 16 has a relatively long through slot 17 and also a smaller, through slot 18 in the lower end thereof. Slide bar 16 is mounted for up and down sliding movement on upright support 12 by means of pins 19 and 20 which extend through suitably formed holes in arms 13A, 13B, and 14A, 14B and through slots 17 and 18, respectively.

Mounted to the front, outwardly extending surface of slide bar 16 is a rack 22 having a plurality of teeth 23. Rack 22 is inset into slide bar 16 by means of screws 24 and 25.

Figure 2:
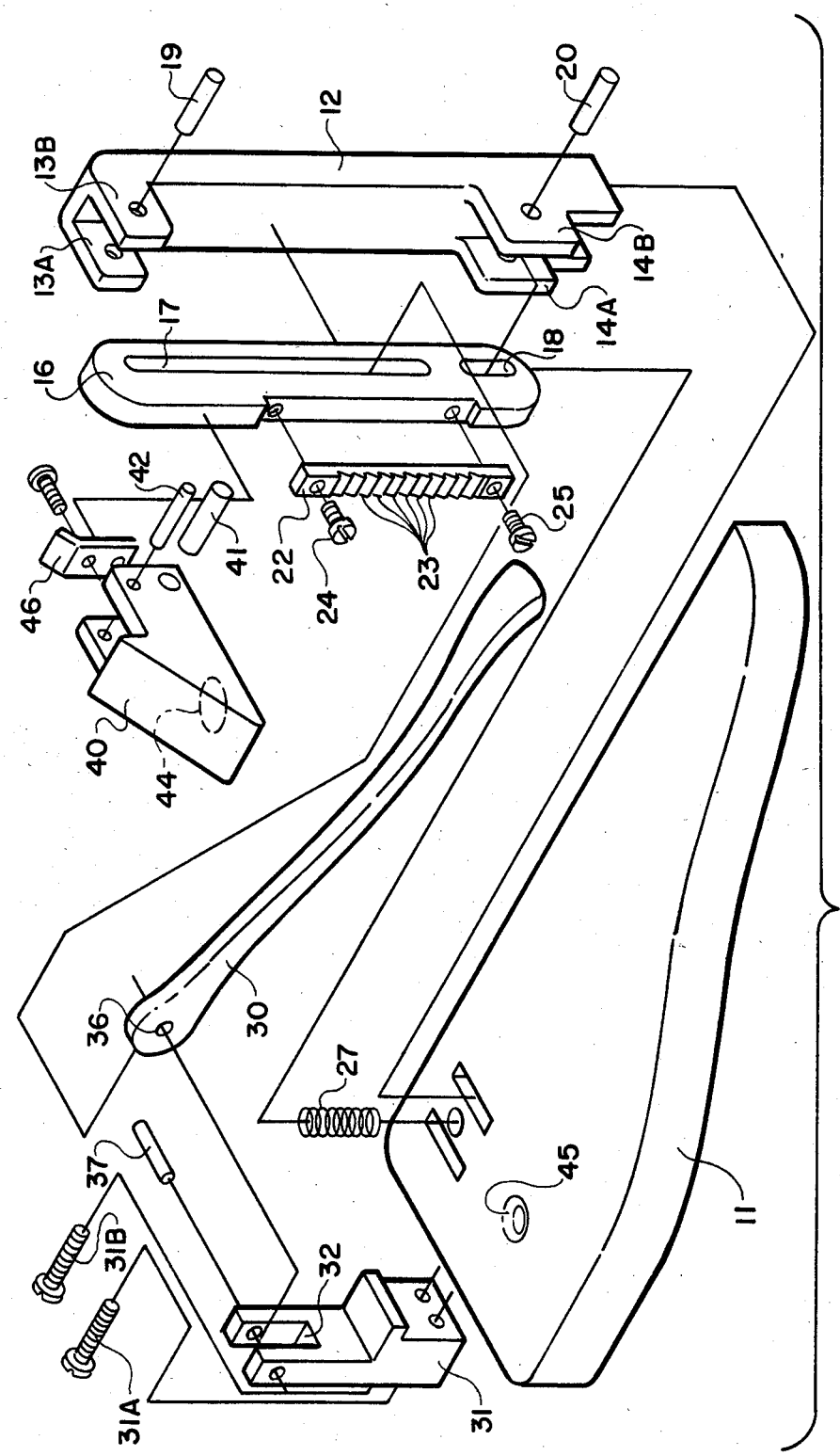
FIG. 2 is an exploded view of the preferred embodiment of the invention shown in FIG. 1.

Referring now to FIG. 2, biasing means such as a spring 27 is mounted directly beneath slide bar 16 and normally urges slide bar 16 in the upward direction relative to upright support 12. A handle 30 is positioned through slot 17 in slide bar 16 and is mounted for reciprocating, pivotal movement on a handle mount 31. Handle mount 31 is mounted on one end of base 11 and is provided with an upwardly extending, U-shaped slot 32 defined by the inwardly facing walls of a pair of spaced apart handle mount arms 33 and 34. Handle mount 31 is mounted to base 11 by screws 31A and 31B. Handle 30 is provided with a through hole 36 in one end, which is positioned in slot 32 and pinned for pivotal movement by means of a pin 37, as is shown in FIG. 2.

Referring again to FIG. 1, a nut-cracking head 40 is pivotally mounted for sliding movement on slide bar 16 independent of the sliding movement of slide bar 16 on upright support 12. Head 40 is pivoted by means of a pin 41 which extends from one side of head 40 to the other and through slot 17 in slide bar 16. The downward pivot of head 40 is restricted by means of another pin 42.

A dimple 44 is preferably formed in the underside of head 40 and cooperates with a similarly sized dimple 45 in base 11 whereby the nut is securely held in position to be cracked.

Nut-cracking head 40 carries a tooth 46 which is positioned to selectively engage the teeth 23 of rack 22.

Figure 3:
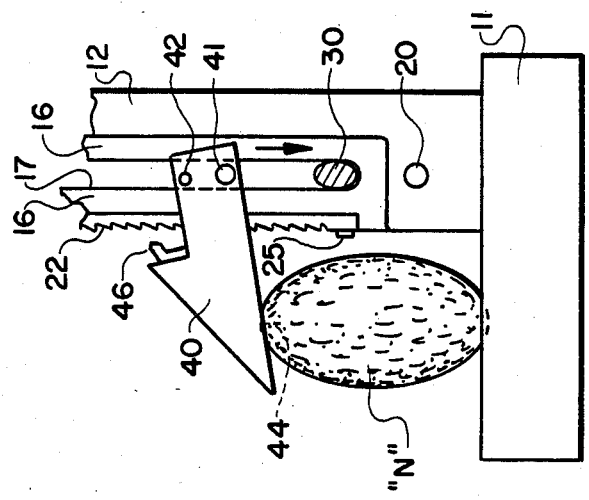
FIG. 3 is an enlarged, fragmentary side elevational view of the tooth on the nut-cracking head out of engagement with the rack on the slide bar.

Referring now to FIG. 3, nut-cracking head is shown just in contact with the upper surface of the nut "N." Tooth 46 is not engaged with rack 22. Head 40 is free to slide down slot 17 and slide bar 16 until the underside of head 40 contacts the top of the nut "N." As slide bar 16 continues downwardly, pins 41 and 42, which are still free to move in slot 17, continue downwardly. However, the other end of head 40 is restrained by the nut "N." As a result, head 40 pivots, moving tooth 46 into contact with rack 22.

Figure 6:
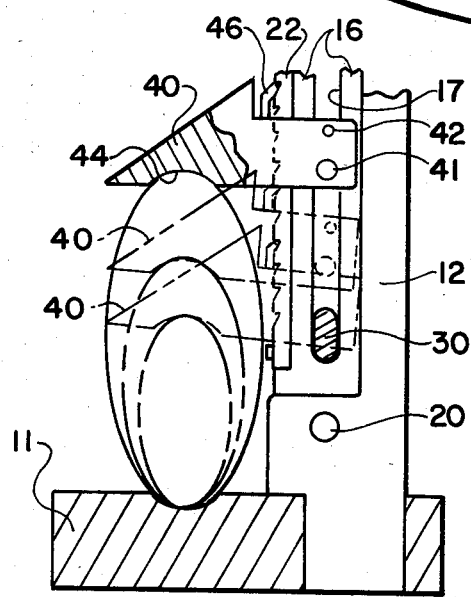
FIG. 6 is an enlarged, fragmentary side elevational view showing the adjustment of the nut-cracking head to a relatively large-sized nut, and in phantom view, adjustment of the nut-cracking head to successively smaller nuts.
Figure 5:
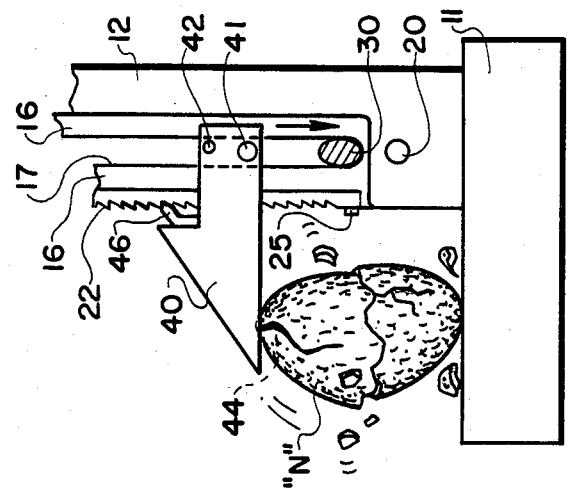
FIG. 5 is a view as in FIGS. 3 and 4, showing the nut-cracking head after it has been moved downwardly sufficient to crack the nut.
Figure 4:
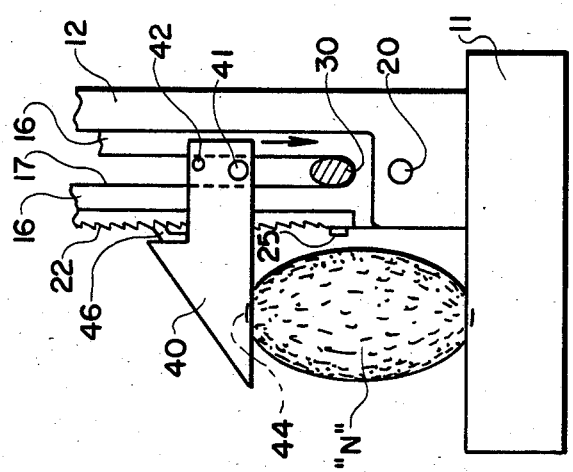
FIG. 4 is a view as in FIG. 3, showing the tooth on the nut-cracking head now engaged with the rack on the slide bar.

Referring now to FIG. 4, tooth 46 is shown in contact with one of the teeth 23 in rack 22. At this point, pins 41 and 42 are no longer permitted to move within slot 17. As handle 30 continues to move downwardly, carrying with it slide bar 16, head 40 bears against nut "N." As soon as the requisite amount of force has been applied to the nut, the nut cracks, handle 30 is released and spring 27 returns handle 30 and slide bar 16 to its upper position. The upward movement of handle 30 carries upwardly within head 40. This releases head 40 from engagement with the nut, allowing tooth 46 to move out of contact with rack 22. With head 40 in its raised position, the cracked nut can be removed and another nut placed in its place. Then the sequence beginning in FIG. 3 and continuing through FIGS. 4 and 5 repeats itself. Depending on the particular size of the nut, the underside of head 40 will contact the upper end of the nut at a particular point in its sliding movement within slot 17. Wherever this point may be, the further downward movement of handle 30 permits pins 42 and 41 to continue pivoting head 40 until tooth 46 seats itself in rack 22. This point is completely variable depending upon the size of the nut. This is shown, in exaggerated form, in FIG. 6. Ordinarily, the variation in nut sizes would not be nearly so great as is shown in FIG. 6. The exaggeration is provided merely for clarity.

In the embodiment shown in this application, the single tooth 46 is carried by head 40 and the multi-toothed rack 22 is carried by slide bar 16. This is considered most desirable because head 40 is much smaller than slide bar 16. Accordingly, the much larger rack 22 is more suitable for the similarly sized slide bar 16. However, it would be possible to place a rack on head 40 and adapt it to engage a single or a very limited number of spaced-apart teeth positioned on the outwardly facing surface of slide bar 16.

As is demonstrated in the above description, nut cracker 10 automatically adjusts the nut-cracking head 40 to compensate for different sized nuts. Moreover, the adjustment is made during the cracking motion so that a trial and error adjustment procedure is avoided. In effect, successive nuts of different size, whether of the same or different species, can be cracked rapidly, without intermediate adjustment, as if all of the nuts were exactly the same size. Since nut cracker 10 is completely self-adjusting, no adjustment is required even if one switches from cracking very small nuts, such as almonds or filberts, to very large nuts such as pecans or walnuts.

A nut cracker is described above. Various details of the invention may be changed without departing from its scope. Furthermore, the foregoing description of the preferred embodiment of the nut cracker according to the present invention is provided for the purpose of illustration only and not for the purpose of limitation—the invention being defined by the claims.

I claim:

1. A nut cracker characterized by automatic adjustment to differing sized nuts during the cracking motion, said nut-cracker comprising:
   (a) a base;
   (b) an upright support carried by said base;
   (c) a slide bar mounted for limited sliding movement on said upright support;
   (d) a nut-cracking head pivotally mounted for sliding movement on said slide bar independent of the sliding movement of said slide bar on said upright support, said head mounted on said slide bar to engage and bear against a nut positioned on said base in engagement relation to said head;
   (e) a handle carried by said base in operative relation with said slide bar to move the slide bar back and forth along its direction of travel in response to movement of said handle;
   (f) a rack carried by said slide bar;
   (g) a tooth carried by said nut-cracking head on the pivotally opposite side of said head from the nut engaging portion thereof and positioned to pivot towards and engage said rack at a point thereon dependent on the size of the nut as the handle moves the head into engagement with the nut to arrest the free movement of said head and cause the head to move in unison with said handle as the handle continues to move into nut-cracking position and pivot the head out of rack-engaging position and permit independent movement of said head relative to said slide bar as the handle is moved out of nut-cracking position, whereby the nut itself provides the means for adjusting the nut-cracking head to the proper position to crack successive, differing-sized nuts.

2. A nutcracker according to claim 1, wherein said support and said slide bar are each vertically mounted in relation to said base.

3. A nutcracker according to claim 1, and including biasing means normally urging said handle out of nut-cracking position whereby said head is released from engagement with said slide bar after each nut-cracking operation.

4. A nutcracker according to claim 1, wherein said base includes a dimple in the surface thereof beneath said head within which a nut is placed to properly position it for engagement by said head.

5. A nutcracker according to claim 1, wherein the nut engaging surface of said head includes a dimple for properly positioning said nut against said head for cracking.

6. A nutcracker according to claim 1, wherein said base includes a dimple in the surface thereof beneath said head within which a nut is placed to properly position it for engagement by said head and wherein the nut engaging surface of said head includes a dimple for properly positioning said nut against said head for cracking.

* * * * *